United States Patent Office 3,227,261
Patented Jan. 4, 1966

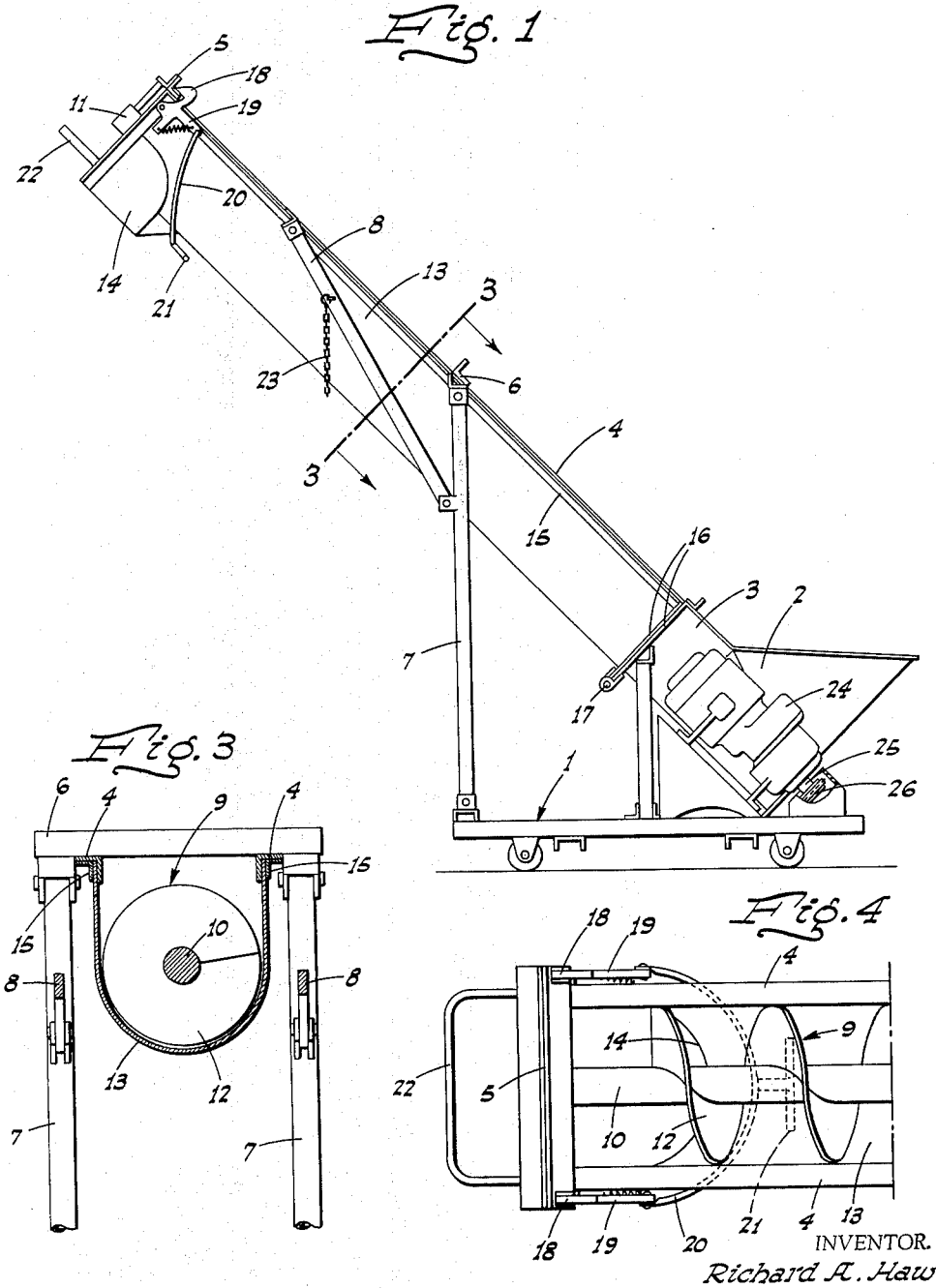

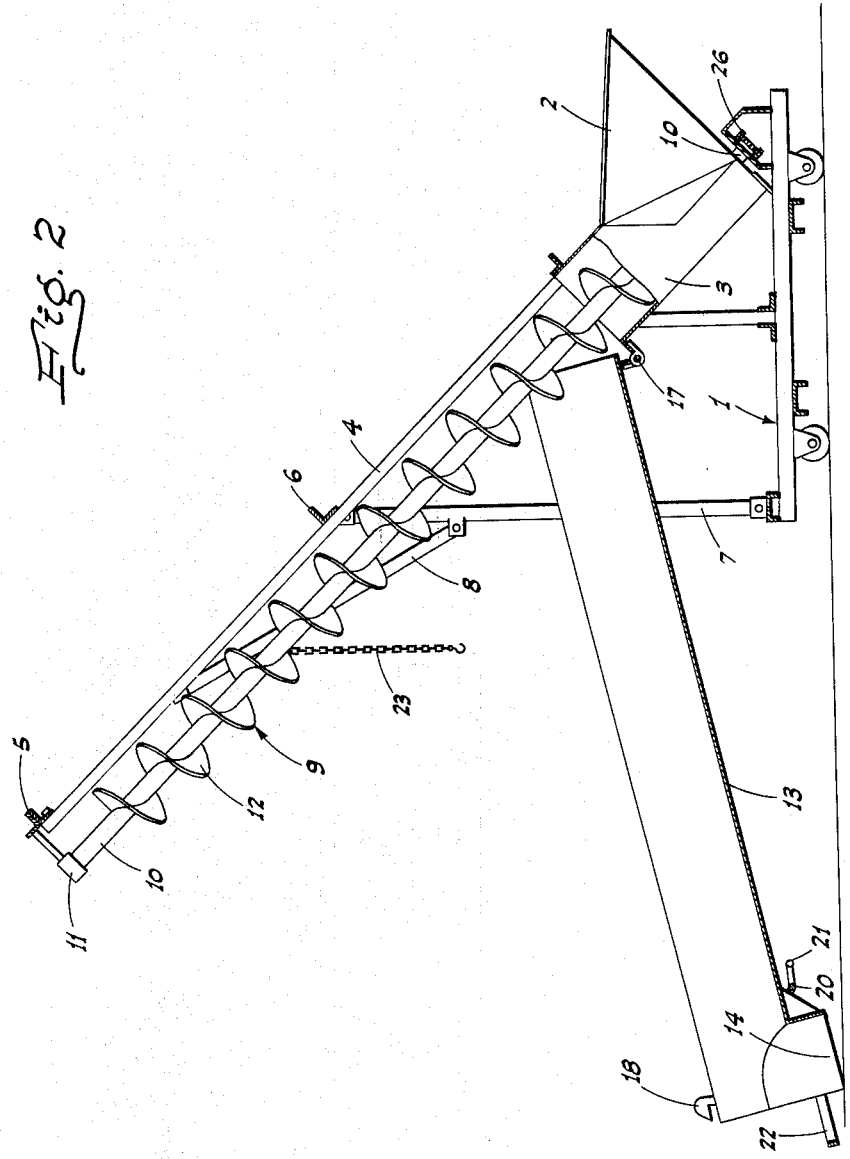

3,227,261
ELEVATING AUGER CONVEYOR
Richard A. Hawley, 2440 Scout Road, Oakland, Calif.
Filed Oct. 5, 1964, Ser. No. 401,458
6 Claims. (Cl. 198—64)

This invention relates in general to a power actuated, screw or auger conveyor of the type employed to move bulk material from one point to another.

In particular, the invention is directed to an auger conveyor of the type used in meat packing plants to load, or unload, meat cutting, grinding and mixing machines or the like; this type of auger conveyor including a trough in which the driven auger runs and with which auger the trough cooperates from below.

Heretofore, such a conveyor has been made with the trough mounted in permanent and immovable relation to the auger, and this was a feature which made the necessary cleaning of the conveyor an undue task and to the extent that upon occasion it was difficult to meet the approval of sanitation inspectors.

It is, therefore, the major object of this invention to provide a conveyor, of the type noted, so constructed that the trough may be released and swung down from its normal position in cooperative relation to the auger, and to a lowered position for easy and thorough cleaning of both of said parts. This also facilitates viewing of the apparatus by an inspector.

A further object of the invention is to mount the trough so that its release and swinging to lowered position, and subsequent return to its raised operative position, can be very conveniently and quickly effected manually.

A further object of the invention is to provide an elevating auger conveyor which is designed for ready and economical manufacture.

A still further object of the invention is to provide a practical, reliable, and durable elevating auger conveyor having the described novel trough feature, and which is exceedingly effective for the purpose for which it is designed.

These objects are accomplished by means of such structure and relative arrangement of parts as will fully appear by a perusal of the following specification and claims.

In the drawings:

FIG. 1 is a side elevation of the improved conveyor in its normal, raised operative position.

FIG. 2 is a similar view, but mainly in section, and showing the conveyor trough in its lowered position.

FIG. 3 is an enlarged fragmentary cross section taken on line 3—3 of FIG. 1.

FIG. 4 is an enlarged fragmentary top plan view of the upper end portion of the conveyor.

Referring now more particularly to the drawings and to the characters of reference marked thereon, the conveyor comprises a longitudinal supporting base 1, preferably of a mobile type. Mounted on the base 1 adjacent one end thereof is a hopper 2 which is formed with and delivers into a stub trough 3 which projects upwardly from the hopper 2 in a direction lengthwise of the base toward the opposite or forward end thereof and at an acute angle of substantially 45 degrees to the horizontal.

Rigid with the hopper 2 and stub trough 3—which in themselves are rigid with the base 1—are transversely spaced elongated angle rails 4 which project forwardly and upwardly from said stub trough parallel to and above the axis thereof. These rails 4 face outwardly and downwardly and are connected at their upper ends by a cross bar unit 5 and intermediate their ends by another cross bar 6. Supporting posts 7 depend from the ends of the cross bar 6 to the base 1, while diagonal braces 8 connect between the posts 7 intermediate their ends and the rails 4 intermediate the cross bar 6 and cross bar unit 5.

Extending continuously from the rear end of the hopper 2 to the upper ends of the rails 4 in axial alinement with the stub trough 3, and thus parallel to said rails, is an auger 9 of conventional form. The axial shaft 10 of the auger is journaled at its lower end in connection with the hopper 2, and at its upper end in a bearing 11 depending from and supported by the cross bar unit 5 as clearly shown in FIG. 2. The diameter of the vane 12 of the auger 9 is substantially the same as the distance between the rails 4, as shown in FIG. 4.

From the forward end of the stub trough 3 to the bearing 11, the auger 9 is normally engaged from below by a cooperating open-topped main trough 13 which is also open at its lower end to match and slightly overlap the forward end of said stub trough 3. At its forward and normally upper end, the main trough 13 is formed with a depending discharge spout 14. At the top thereof the sides of the trough 13 are braced or stiffened on the outside by angle rails 15 which fit within the rails 4, as shown in FIG. 3.

At their matching ends, the stub trough 3 and main trough 13 are stiffened on the outside by normally contacting flanges 16, as shown in FIG. 1, and which at the bottom are connected by a transverse axis hinge unit 17. Such hinge unit 17 permits the main trough 13 to be lowered from its normal and raised, auger engaging position without having to be actually detached or removed from the apparatus.

The hinge unit 17 is at such a height from the floor on which the base 1 rests that when the main trough 13 is swung down so that the spout 14 will rest on the floor, said trough will be disposed in its lowered position and at a downward slope toward its forward end, as shown in FIG. 2. This feature enables the water used to wash the trough 13 to drain of itself from the spout end of said trough.

To releasably hold the main trough 13 in its normal and raised position cooperating with the auger 9, spring advanced catch hooks 18 are pivoted on the sides of said trough 13 at its upper end and in position to engage over overhanging end portions of the cross bar unit 5 at the rear end thereof, as shown in FIGS. 1 and 4. Each catch hook is provided with a rearwardly projecting substantially radial arm 19; a pull yoke 20—which straddles the main trough 13 from below—being connected at its upper ends to the arms 19 of both catch hooks. This pull yoke serves to disengage the catch hooks from the bar unit 5; said yoke being provided with a centrally disposed handle 21 to facilitate manual operation of the yoke, and simultaneous disengagement of such catch hooks.

At its upper end the main trough 13 is provided with a forwardly projecting bail or handle 22 whereby lowering of said trough may be manually controlled when the catch hooks 18 are released.

In addition, a safety chain 23 or similar flexible member extends about the lower portion of the main trough 13; said chain being permanently connected at one end to one brace 8 and detachably hooked at the other end to the opposite brace, as shown. This safety chain, of course, prevents accidental and sudden dropping of the trough should the catch hooks be released before the operator takes hold of the handle 22. Such safety chain must, of course, be unhooked before any lowering of the trough can take place.

When the main trough is in its lowered position and entirely clear of the auger 9 both of such parts can be easily and thoroughly cleaned, and additionally are wholly exposed for inspection.

The auger 9 is driven from its lower end by means of a motor and gear box unit 24 which is mounted on the base 1 alongside the hopper 2 and having a shaft 25 projecting from its rear end parallel to the auger shaft 10 and connected thereto by an endless chain drive 26 or the like.

It will be noted that the base 1, together with the rails 4, the posts 7 and the cross bar unit 5, form a supporting frame for the auger and the associated trough assembly.

From the foregoing description, it will be readily seen that there has been produced such an elevating auger conveyor as substantially fulfills the objects of the invention, as set forth herein.

While this specification sets forth in detail the present and preferred construction of the elevating auger conveyor, still in practice such deviations from such detail may be resorted to as do not form a departure from the spirit of the invention, as defined by the appended claims.

Having thus described the invention, the following is claimed as new and useful and upon which Letters Patent is desired:

1. A conveyor comprising a frame, an elongated trough normally disposed with an upward slope from one end to the other, a fixed hopper feeding to the lower end of the trough, a discharge spout at the upper end of the trough, a material conveying member disposed lengthwise in the trough and supported from the frame, means hingedly mounting the trough at its lower end in connection with the hopper for downward movement of said trough to a lowered clearance position from a normal raised position cooperating with said conveying member, and releasable catch means between the trough and frame preventing such movement.

2. A conveyor, as in claim 1, in which the frame includes a transverse bar unit above the upper end of the trough; and the catch means comprises catch hooks pivoted on the sides of the trough at its upper end and normally in engagement with said bar unit, and a manually operable pull unit extending upwardly from under the trough to connections with both hooks to simultaneously release the same from said bar unit.

3. A conveyor, as in claim 1, in which the height of the trough hinging means relative to the level of the surface on which the frame rests is such that when the trough is in lowered position and rests at its normally upper end on such surface, said trough is then disposed at a downward slope from its normally lower end.

4. A conveyor comprising a frame, an elongated trough normally disposed with an upward slope from one end to the other, a fixed hopper feeding to the lower end of the trough, a discharge spout at the upper end of the trough, the frame including rigid longitudinal rails extending upwardly from the hopper in transversely spaced parallel relation, and supporting posts depending from the rails intermediate their ends; an elongated auger extending from the hopper to the upper ends of the rails between the same and with its axis parallel to said rails but below the same, a cross bar unit connecting the rails at their upper end, a bearing member supported from said cross bar unit for the adjacent end of the auger, the elongated trough normally fitting about the lower portion of the auger and depending from the rails and between the posts, means transversely hingedly connecting the trough at its lower end to the adjacent end of the hopper, and releasable catch means between the upper end of the trough and said cross bar unit.

5. A conveyor, as in claim 4, with a manually engageable handle member mounted on and projecting from the upper end of the trough.

6. A conveyor including an elevated frame, an elongated auger journaled on the frame, an elongated trough normally in a raised position and cooperating with the auger from below, means hinging the trough at one end to the frame for downward swinging movement to a lowered position clear of said auger, and normally engaged but manually releasable catch means between the other end of the trough and said frame.

References Cited by the Examiner
UNITED STATES PATENTS 1,190,564   7/1916   Lindsay _____ 198—204

FOREIGN PATENTS 536,423   1/1957   Canada.

HUGO O. SCHULZ, *Primary Examiner.*
RICHARD E. AEGERTER, *Examiner.*